United States Patent [19]

Parker

[11] Patent Number: 5,557,876
[45] Date of Patent: Sep. 24, 1996

[54] FISHING ROD HOLDER

[76] Inventor: Michael D. Parker, 15088 Holleyside Dr., Montclair, Va. 22026

[21] Appl. No.: 399,647

[22] Filed: Mar. 7, 1995

[51] Int. Cl.$^6$ ..................................... A01K 97/10
[52] U.S. Cl. ............................. 43/21.2; 248/538
[58] Field of Search ................ 43/21.2, 17; 248/538, 248/410, 125.1, 217.1

[56] References Cited

U.S. PATENT DOCUMENTS

| | | | |
|---|---|---|---|
| D. 347,678 | 6/1994 | McCann, Jr., et al. | D22/148 |
| 1,256,191 | 2/1918 | Wittkowski | 43/21.2 |
| 2,033,007 | 3/1936 | Raithel | 248/538 |
| 2,249,302 | 7/1941 | Smith | 43/21.2 |
| 2,550,023 | 4/1951 | Reilly | 248/513 |
| 2,704,411 | 3/1955 | Carroll | 43/17 |
| 2,704,412 | 3/1955 | Davis | 248/515 |
| 2,971,734 | 1/1960 | Grimes | 248/517 |
| 3,007,661 | 11/1961 | Knopf | 248/515 |
| 3,190,594 | 6/1965 | Chion | 43/21.2 |
| 3,570,793 | 3/1971 | Shackel | 43/21.2X |
| 4,012,861 | 3/1977 | Gellatly | 248/515 |
| 4,093,171 | 6/1978 | Mengo, Sr. | 248/515 |
| 4,142,316 | 3/1979 | Greer et al. | 43/21.2 X |
| 4,372,072 | 2/1983 | Comeau | 248/515 |
| 4,641,453 | 2/1987 | Roberts, Sr. | 43/17 |
| 4,819,903 | 4/1989 | Jimenez | 248/538 |

OTHER PUBLICATIONS

Rod Holders Come of Age; by Kurt Beckstrom; " NORTH AMERICAN FISHERMAN : Boats & Accessories"; vol. 8, No. 2, Mar. 1995, p. 46.

Primary Examiner—J. Elpel
Attorney, Agent, or Firm—Michael D. Parker

[57] ABSTRACT

A tubular fishing rod holder capable of being used from a bank of a body of water or from a boat. The fishing rod holder having a rearward end, a mounting portion and a holding portion, wherein the holding portion is adapted to accommodate the handle portion of, for example, spinning, spin casting or bait casting fishing rods. The mounting portion comprises a top receiving hole, a bottom receiving hole and a side cut out portion connecting the top and bottom receiving holes, wherein the top receiving hole is positioned further away from the rearward end than the bottom receiving hole such that the side cut out portion is preferably formed at a 45° angle. The mounting portion allows the fishing rod holder to be removably mounted to a support in a cantilevered arrangement so that the fishing rod holder will position a fishing rod with easy reach of a fisherman.

15 Claims, 3 Drawing Sheets

FISHING ROD HOLDER

BACKGROUND OF THE INVENTION

1. Field of the Invention

This invention relates to a device for holding a fishing rod in a raised position, and more particularly to a rod holder for holding a fishing rod so as to free a fisherman from holding the fishing rod manually. The invention uses a unique mounting arrangement so that the rod holder can be mounted onto a support such as, but not limited to, a standard, a seat pedestal of a fishing boat or on a leg of a lawn chair, which keeps the reel from coming into contact with the ground.

2. Description of the Prior Art

Rod holders were initially used by fishermen while still fishing, but have also come to be utilized during trolling, drifting and even jigging, for example. Rod holders range from a forked stick embedded into the bank of a body of water to tubes which can be embedded into the bank of a body of water and to adjustable models mountable on fishing boats.

Ural E. Davis describes a FISHING ROD HOLDER in U.S. Pat. No. 2,704,412 which can be mounted onto a support standard embedded into the bank of a stream or clamped onto a boat, wherein the rod holder is comprised of a substantially semi-cylindrical cradle hinged to a tube which is to mounted onto the support standard. Davis's rod holder requires the use of a U-shaped clip to hold the fishing rod in the cradle.

Walter E. Knopf describes a FISHING ROD HOLDER in U.S. Pat. No. 3,007,661 having a ground insertable end portion, a rod support end portion and a cylindrical socket middle portion. Knopf's device is usable only after it has been inserted into the ground which may be difficult to do in some locations and is not usable in areas where there is no "ground" in which the rod holder can be inserted, such as a fishing pier.

Walter L. Gellatly's FISHING POLE HOLDER described in U.S. Pat. No. 4,012,861 has a tubular member for receiving the fishing rod handle, a support spike driven into the ground and a biasing device connected between the tubular member and the support spike which is capable of pivoting and thus assisting in setting a hook in a biting fish. Gellatly's device is usable only after it has been inserted into the ground which may be difficult to do in some locations and is not usable in areas where there is no "ground" in which the rod holder can be inserted, such as a boat dock.

The FISHING ROD HOLDER described by Alfred Mengo, Sr. in U.S. Pat. No. 4,093,171 has a tubular member into which a handle of a fishing rod can be inserted. The tubular member is attached to a bracket which can swivel at various angles vertically, wherein the bracket is pivotally attached to a base adapted to be mounted on the hull of a boat. Mengo's device is secured to the boat's hull by three screws and thus is not capable of being repositioned or moved to support a rod from the bank of a stream.

Joseph E. Comeau describes in U.S. Pat. No. 4,372,072 a FISHING ROD HOLDER HAVING DUAL MOUNTING CAPABILITIES so that the holder can be placed in the sand or mounted onto a bumper of a vehicle. Comeau's rod holder comprises a longitudinal tubular member having a reel accommodating slot, wherein the tubular member is secured to a spiked member containing an anchor plate. Also provided is a bracket assembly which mounts to a bumper of a vehicle and receives the rod holder. Comeau's device is intended to be used from the shore of a body of water and cannot be used on a fishing boat.

U.S. Pat. No. Des. 347,678 by William F. McCann and Daniel J. Dryna illustrates a COMBINED FISHING ROD HOLDER AND TROLLING BOARD intended for use on a trolling fishing boat, and is capable of using a looped wire type rod holder or a tubular rod holder. McCann et al.'s device is not capable of being used from the bank of a river.

SUMMARY OF THE INVENTION

As one can ascertain from the foregoing prior art, there are many embodiments of fishing rod holders for assisting a fisherman which allow the fisherman to attend to other tasks or more than one fishing rod. These devices are not usually of a versatile nature which will allow the holder to be used on a fishing boat as well from the shore of a body of water. Further, some of the known holders position the rod close to the surface of the ground or boat's hull, and thus places the rod in a position not quickly reached by the fisherman when a fish takes the bait.

It is an object of the present invention to provide a fishing rod holder which is capable of being used from the shore as well as from a boat, is light in weight and easy to manufacture from various noncorrosive materials such as aluminum, galvanized pipe, pvc pipe, etc.

Another object of the present invention is to provide a fishing rod holder that is removably mounted to a support, which is capable of being positioned anywhere along the length of the support, which can be pivoted around the support to a desired position, and which keeps the rod off the surface of the ground or boat's hull.

It is also an object of the present invention to provide a fishing rod holder that can be removably mounted to a seat in which a fisherman is seated so as to position a fishing rod within easy reaching distance and allow for quick and easy insertion or removal of the fishing rod from the rod holder.

Principal features of the present invention comprise a tubular device having a rearward end, a mounting portion and a holding portion, wherein the holding portion is adapted to accommodate the handle portion of, for example, spinning, spin casting and bait casting fishing rods. The mounting portion comprises a top receiving hole, a bottom receiving hole and a side cut out portion connecting the top and bottom receiving holes, wherein the top receiving hole is positioned further away from the rearward end than the bottom receiving hole such that the side cut out portion is preferably formed at, but not limited to, a 45° angle.

Additional objects and features of the invention will become apparent from the following detailed description of the invention, taken together with the accompanying drawings showing preferred embodiments of the invention.

DETAILED DESCRIPTION OF THE INVENTION

Figure 1:
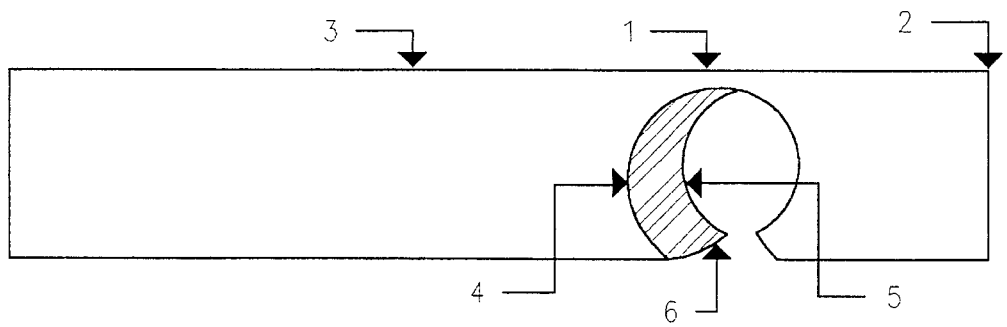
FIG. 1 is a top view of a first embodiment of a fishing rod holder.
Figure 2:
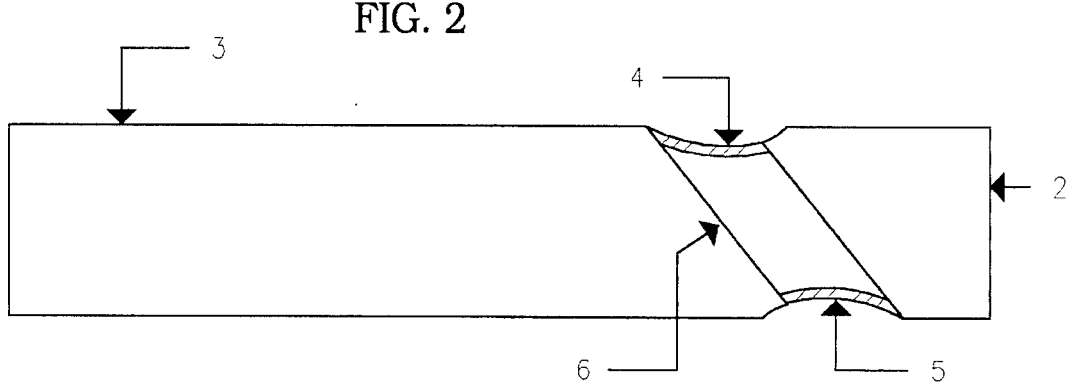
FIG. 2 is a side view of the first embodiment of the fishing rod holder.
Figure 3:
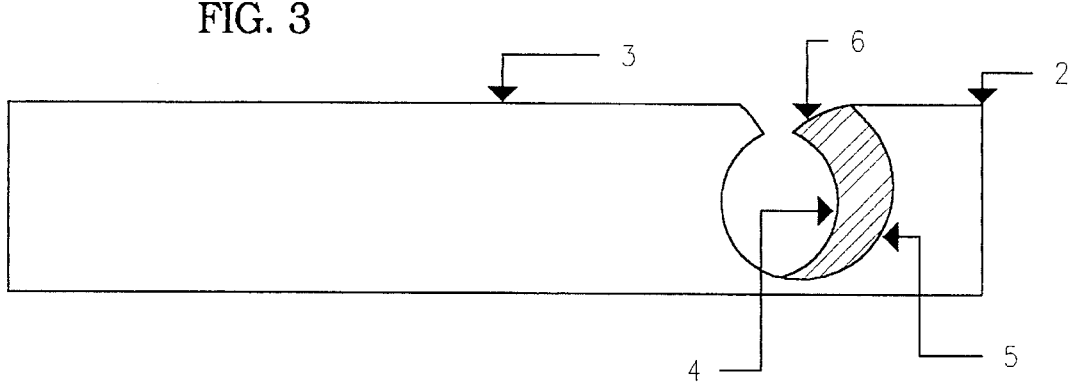
FIG. 3 is a bottom view of the first embodiment of the fishing rod holder.

FIGS. 1–3 illustrate the fishing rod holder from three different views, a top view, a side view and a bottom view, respectively, wherein the fishing rod holder comprises a mounting portion 1, a rearward end 2, and a holding portion 3, wherein the fishing rod holder has a tubular form, i.e., pipe form, and is manufactured from a noncorrosive light weight material, such as, aluminum, chrome or nickel plated sheet metal, galvanized steel, or plastic such as rigid polyvinyl chloride.

Holding portion 3 is of sufficient diameter and length to accommodate the handle portion of, for example, spinning, spin casting and bait casting fishing rods, wherein the diameter is preferably, but not limited to, 1½ or 2 inches.

The fishing rod holder's rearward end 2 is formed as either a closed end or an open end having the same diameter as holding portion 3. It is desirable to form rearward end 2 as a closed end in order to accommodate a floating material therein so as to keep the fishing rod holder afloat should the fishing rod holder be dropped into the water. However, when rearward end 2 is formed as an open end, a cap (not shown) having the floating material therein may be provided to close the open ended rearward end.

Mounting portion 1 comprises a top receiving hole 4 as shown in FIG. 1, a side cut out portion 6 as shown in FIG. 2 and a bottom receiving hole 5 as shown in FIG. 3. Side cut out portion 6 is of a sufficient width which will allow a support (not shown) to be passed therethrough. Top receiving hole 4 is located farther away from rearward end 2 than bottom receiving hole 5. Side cut out portion is preferably formed at, but not limited to, a 45° angle, and connects top receiving hole 4 to bottom receiving hole 5. Note that the holding portion 3 will be raised higher than the rearward end 2 in a cantilevered arrangement when the fishing rod holder is mounted to a support, and that the further top receiving hole 4 is positioned away from rearward end 2, wherein the bottom receiving hole remains a predetermined distance from rearward end 2, then the greater the raised height of holding portion 3. Further, the edges formed by the top receiving hole 4, bottom receiving hole 5 and side cut out portion 6 may be lined with a rubber gasket (not shown) so as to increase the friction between the fishing rod holder and the support on which it is mounted to thus help the fishing rod holder to remain positioned at the location on the support to which it was mounted.

Figure 4:
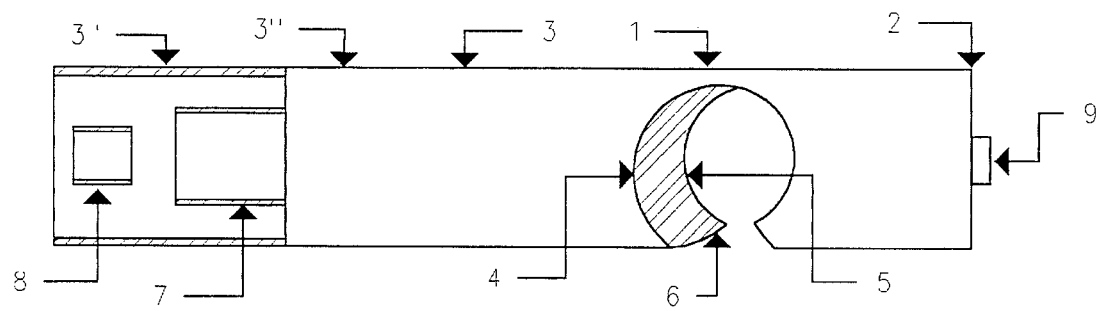
FIG. 4 is a top view of a second embodiment of the fishing rod holder.
Figure 5:
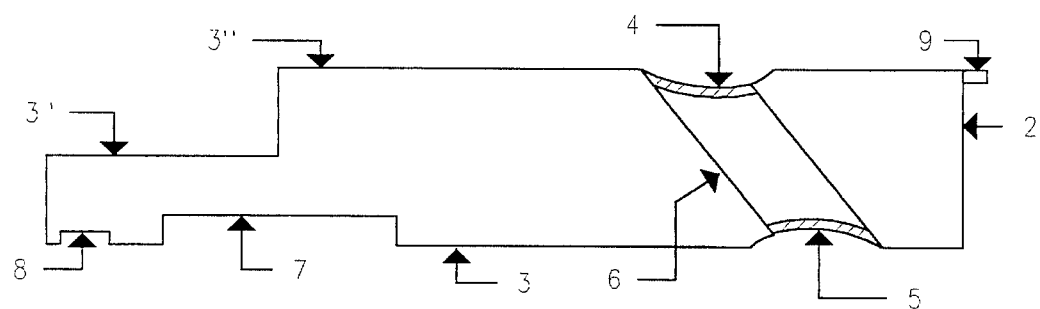
FIG. 5 is a side view of the second embodiment of the fishing rod holder.
Figure 6:
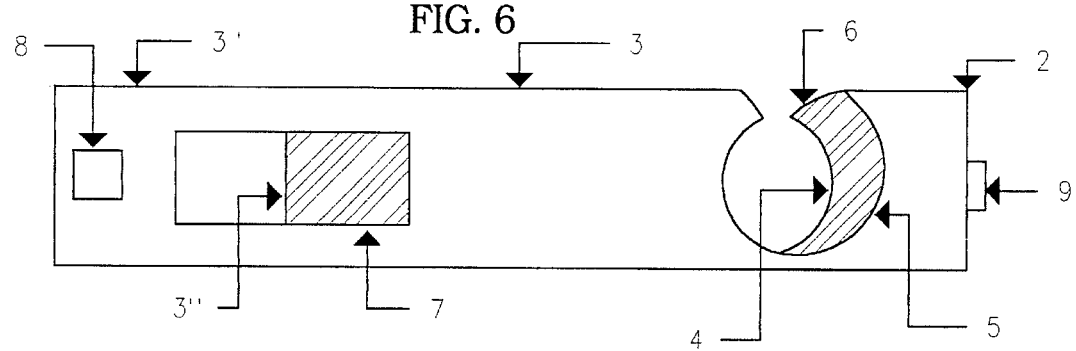
FIG. 6 is a bottom view of the second embodiment of the fishing rod holder.

FIGS. 4–6 illustrate a second embodiment of the fishing rod holder from three different views, a top view, a side view and a bottom view, respectively. Those components shown in the first embodiment and remaining the same in the second embodiment will have the same reference numerals. The second embodiment differs from the first embodiment at the holding portion 3. FIGS. 4–6 illustrate a semicylindrical cradle portion 3' and a cylindrical portion 3" which form holding portion 3.

An opening 8, shown in FIGS. 4–6, accommodates the trigger finger grip found on some fishing rods, such as a bait casting rod or a spin casting rod. It is well known that the bait casting rod differs from a spin casting rod and a spinning rod by, for example, the length and shape of the rod handles. Bait casting rods have a shorter handle length and has a bulbous end which is larger than the rest of the handle. Accordingly, opening 7 is provided to allow a bottom portion of the bulbous end of the bait casting rod's handle to protrude through the opening 7 so that a top portion of the bulbous end of the bait casting rod's handle abuts the top inside wall of cylindrical portion 3" when the inside diameter of holding portion 3, without opening 7 (as shown in FIG. 1, for example), is not sufficiently large enough to accept the bulbous end of the bait casting rod's handle.

Figure 7:
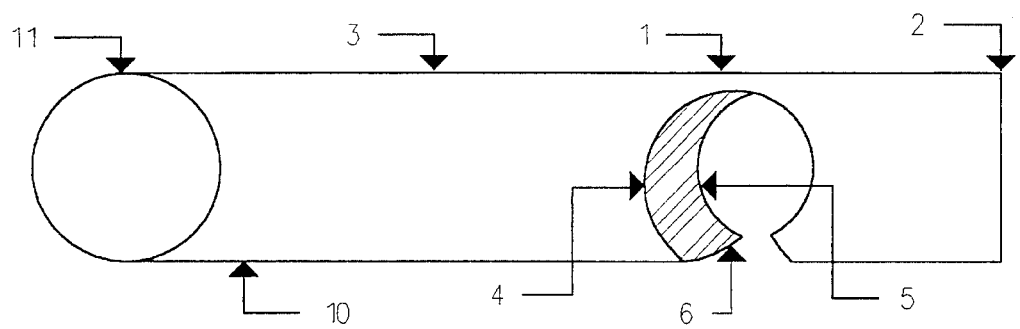
FIG. 7 is a top view of a third embodiment of the fishing rod holder.
Figure 8:
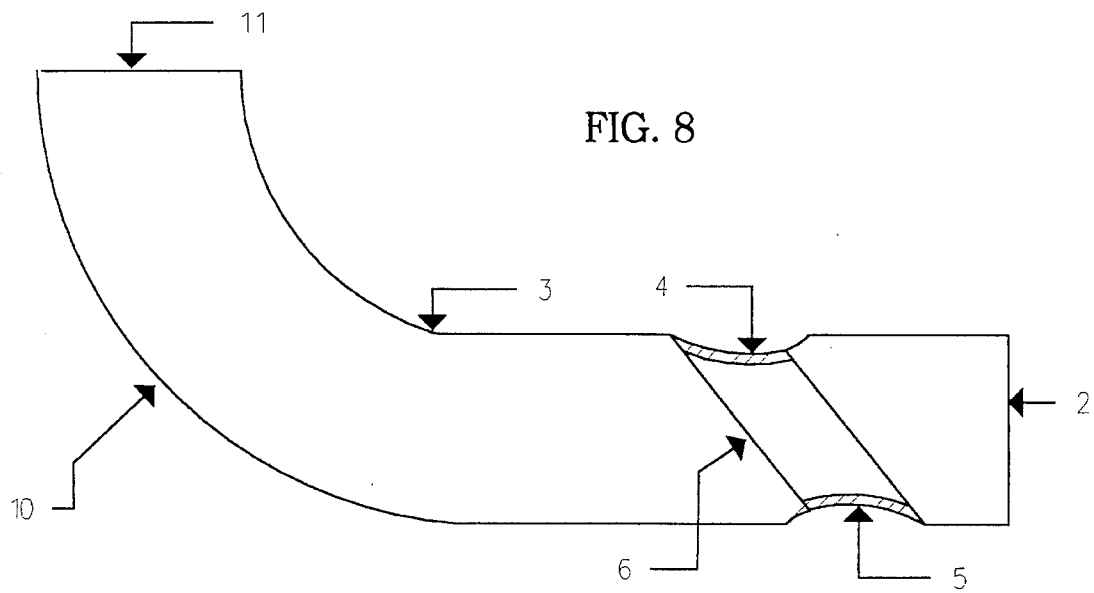
FIG. 8 is a side view of the third embodiment of the fishing rod holder.

FIGS. 7 and 8 illustrate a third embodiment of the fishing rod holder from a top view and a side view, respectively. Those components shown in the first embodiment and remaining the same in the third embodiment will have the same reference numerals. The third embodiment differs from the first embodiment at the holding portion 3. The holding portion 3 of the third embodiment comprises a 90° elbow portion 10 having an opening 11 which will allow the fishing rod to be positioned in a more upright angle. Opening eleven may be flared so as not to provide any sharp edges against which the handle of a fishing rod will rest. The fishing rod holder of the third embodiment is the preferred embodiment of the fishing rod holder which will be supported in a cantilevered arrangement on a raised pedestal of a seat commonly found in, for example, a bass fishing boat.

Further, provided is a biasing support lip 9 extending from the rearward end of the fishing rod holder of the second embodiment, shown in FIGS. 4–6, but which can also be provided on the first and second embodiments. Biasing support lip 9 allows for a biasing element, such as a rubber band, to be looped around the support on which the fishing rod holder is mounted to increase the friction between the edge of the top receiving hole 4 and the support. It should be noted that neither that the added weight of the fishing pole at the holding portion 3 increases the friction between the fishing rod holder and the support to which it is mounted such that the foregoing biasing means or rubber gasket are not really necessary, although the rubber gasket has an added benefit of keeping the holder from scratching the support.

While preferred embodiments of the present invention have been particularly shown and described, it will be understood by those skilled in the art that other changes in form and details, such as following the contours of the tubular fishing rod holder to form a fishing rod holder from a wire rod, may be made without departing from the spirit and scope of the present invention as defined by the appended claims. It will be further understood by those skilled in the art that the holder can be used to hold other items, such as a flag, for example. Another example would be to form the top and bottom receiving holes in a hexagonal shape so that the fishing rod holder can be used on a square support as well as a round support. An additional example would entail forming the fishing rod holder as two sections which can be attached to each other so that the mounting portion can be changed from one which accommodates a support of narrow diameter to one which will accommodate a support of a larger diameter, or the holding portion can be changed from the first embodiment to the second or third embodiments. A further example would be to include a cup holder attached to the holding portion 3 so that a fisherman can enjoy a drink while waiting for a fish to bite.

I claim:

1. A tubular fishing rod holder comprising:
  a single cylindrical tube comprising:
    a rearward end;

a holding portion for receiving and holding a handle portion of a fishing rod; and a mounting portion, formed between said rearward end and said holding portion, for mounting said fishing rod holder on a support, said mounting portion comprising:

a top receiving hole formed in a top portion of said cylindrical tube at a first distance away from said rearward end;

a bottom receiving hole being formed in a bottom portion of said cylindrical tube at a second distance from said rearward end, wherein said first distance is greater than said second distance; and a side cut out portion connecting said top receiving hole to said bottom receiving hole.

2. The tubular fishing rod holder as set forth in claim 1, said side cut out portion being formed in a side portion of said cylindrical tube at a predetermined angle with respect to said bottom portion of said cylindrical tube to connect said top receiving hole to said bottom receiving hole.

3. The tubular fishing rod holder as set forth in claim 1, said side cut out portion being formed in a side portion of said cylindrical tube at an angle of 45° with respect to said bottom portion of said cylindrical tube.

4. The tubular fishing rod holder as set forth in claim 2, said predetermined angle at which said side cut out portion is formed is an angle of approximately 45°.

5. The tubular fishing rod holder as set forth in claim 1, said holding portion comprising:

a semicylindrical cradle portion;

a cylindrical portion disposed between said semicylindrical cradle portion and said mounting portion;

a first opening formed through a bottom area of said semicylindrical cradle portion for accommodating a trigger finger grip extending from said handle portion; and a second opening for accommodating a bottom portion of a bulbous end portion of said handle portion, said second opening being formed in a bottom area of said semicylindrical cradle portion and extending into a bottom area of said cylindrical portion.

6. The tubular fishing rod holder as set forth in claim 1, said holding portion comprising:

an elbow portion having an opening through which said handle portion of said fishing rod is positioned into said elbow portion.

7. The tubular fishing rod holder as set forth in claim 6, said elbow portion comprising a 90° elbow.

8. The tubular fishing rod holder as set forth in claim 1, further comprising a biasing support means at said rearward end.

9. The tubular fishing rod holder as set forth in claim 8, said biasing support means comprising a lip rearwardly extending from a top edge of said rearward end.

10. A tubular fishing rod holder comprising:

a rearward end;

a holding portion for receiving and holding a handle portion of a fishing rod said holding portion comprising:

a semicylindrical cradle portion;

a cylindrical portion adjacent said semicylindrical cradle portion;

a first opening formed through a bottom area of said semicylindrical cradle portion for accommodating a trigger finger grip extending from said handle portion; and a second opening for accommodating a bottom portion of a bulbous end portion of said handle portion, said second opening being formed in a bottom area of said semicylindrical cradle portion and extending into a bottom area of said cylindrical portion; and a mounting portion, disposed between said cylindrical portion and said rearward end, for mounting said fishing rod holder on a support in a cantilevered arrangement, said mounting portion comprising:

a top receiving hole formed at a first distance away from said rearward end;

a bottom receiving hole being formed at a second distance from said rearward end, wherein said first distance is greater than said second distance; and a side cut out portion being formed at a predetermined angle for connecting said top receiving hole to said bottom receiving hole.

11. The tubular fishing rod holder as set forth in claim 10, further comprising a biasing support lip rearwardly extending from a top edge of said rearward end.

12. A fishing rod holder formed from a pipe of predetermined diameter, wherein said pipe has a forward end of predetermined length and of predetermined diameter for accommodating a handle of a fishing rod, a rearward end, and a mounting portion, disposed between said forward end and said rearward end for removably mounting said fishing rod holder to a support, said mounting portion comprising:

a first opening through a top portion of said pipe;

a second opening through a bottom portion of said pipe, said second opening being formed at a position closer to said rearward end than said top opening; and a side cut out portion formed in a side portion of said pipe, said side cut out portion connecting said first opening to said second opening.

13. The fishing rod holder as set forth in claim 12, wherein said side cut out portion is formed at a predetermined angle with respect to said bottom portion of said pipe.

14. The fishing rod holder as set forth in claim 13, wherein said predetermined angle is a 45° angle.

15. The fishing rod holder as set forth in claim 12, wherein said pipe is formed from a light weight noncorrosive material.

* * * * *